United States Patent [19]

Van Der Tol et al.

[11] Patent Number: 5,364,495
[45] Date of Patent: Nov. 15, 1994

[54] METHOD OF MANUFACTURING SHARP WAVEGUIDE BRANCHES IN INTEGRATED OPTICAL COMPONENTS

[75] Inventors: Johannes J. G. M. Van Der Tol, Zoetermeer; Eduard G. Metaal, The Hague; Jorgen W. Pedersen, Delft, all of Netherlands

[73] Assignee: Koninklijke PTT Nederland N.V., Groningen, Netherlands

[21] Appl. No.: 154,958

[22] Filed: Nov. 19, 1993

[30] Foreign Application Priority Data

Nov. 26, 1992 [NL] Netherlands .......................... 9202059
Jun. 18, 1993 [NL] Netherlands .......................... 9301071

[51] Int. Cl.$^5$ ...................... H01L 21/306; B44C 1/22; C03C 15/00
[52] U.S. Cl. .................... 156/643; 156/649; 156/651; 156/657; 156/661.1; 156/662
[58] Field of Search ............... 156/643, 651, 655, 657, 156/659.1, 661.1, 662, 649; 385/44, 45, 50, 132

[56] References Cited

U.S. PATENT DOCUMENTS

| | | | |
|---|---|---|---|
| 4,938,841 | 7/1990 | Shahar et al. | 156/661.1 |
| 5,032,219 | 7/1991 | Buchmann et al. | 156/643 |
| 5,271,801 | 12/1993 | Valette | 156/647 X |

FOREIGN PATENT DOCUMENTS

3291605 12/1991 Japan .

OTHER PUBLICATIONS

Y. Shani et al, "Buried Rib Passive Waveguide Y Junctions with Sharp Vertex on INP", Mar. 1991, pp. 210–212, IEEE Photonics Technology Letters, vol. 3, No. 3.

E. C. M. Pennings, et al, "Ultracompact, Low-Loss Directional Couplers on InP Based on Self–Imaging by Multimode Interference", Oct. 14, 1991, pp. 1926–1928, Applied Physics Letters, No. 16.

U. Niggebrügge, et al, "A Novel Process for Reactive Ion Etching on InP, Using $CH_4/H_2$", 1985, pp. 367–372 and title page, Institute Phys. Conf.

H. W. Lehmann, et al, "Profile Control by Reactive Sputter Etching", Mar./Apr. 1978, pp. 319–326, J. Vac. Sci. Technol.

*Primary Examiner*—William Powell
*Attorney, Agent, or Firm*—Frishauf, Holtz, Goodman & Woodward

[57] ABSTRACT

To manufacture a channel-type waveguide pattern (1.1) having Y-shaped branches and a sharp vertex (V) on or in a substrate (1), masks (6 and 7) which partially overlap one another are used for two different etching steps, which successively define a part of the Y-shaped pattern. In this process, use is made of only one auxiliary mask layer (2) made of suitably chosen material which can be etched in the first etching step but is resistant in a second etching step involving dry etching.

13 Claims, 5 Drawing Sheets

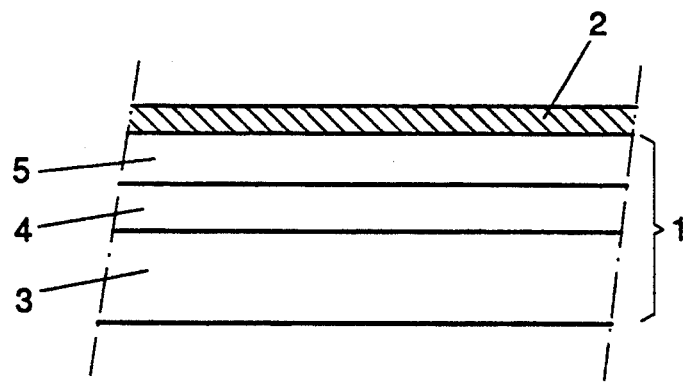
FIG. 1
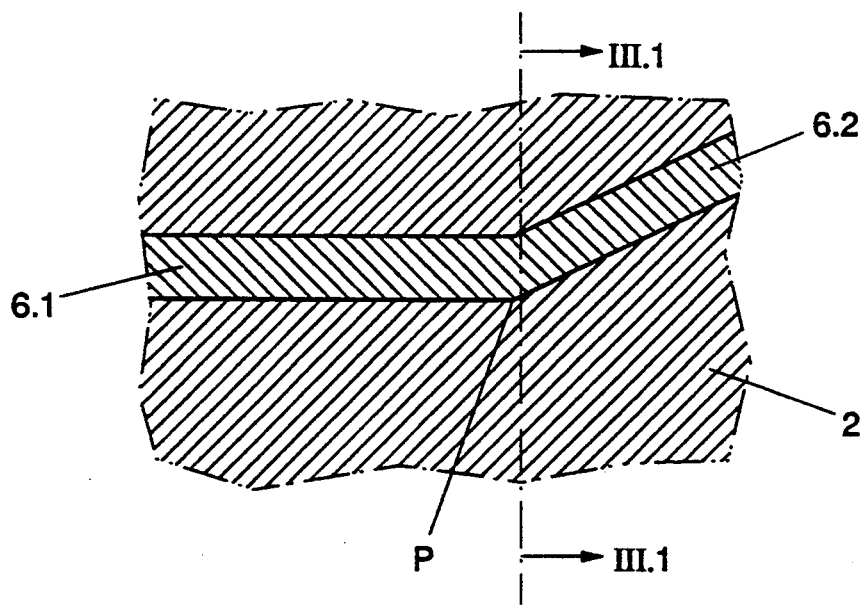
FIG. 2.1
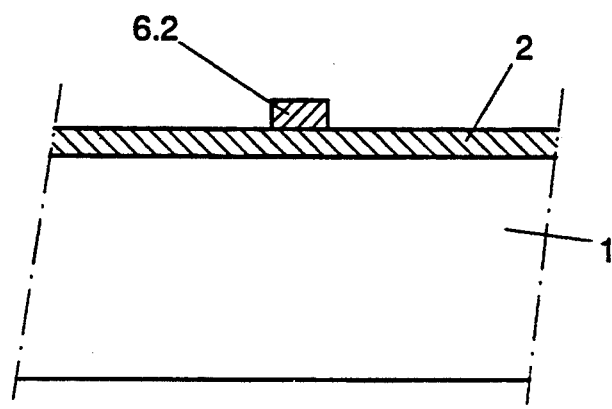
FIG. 3.1

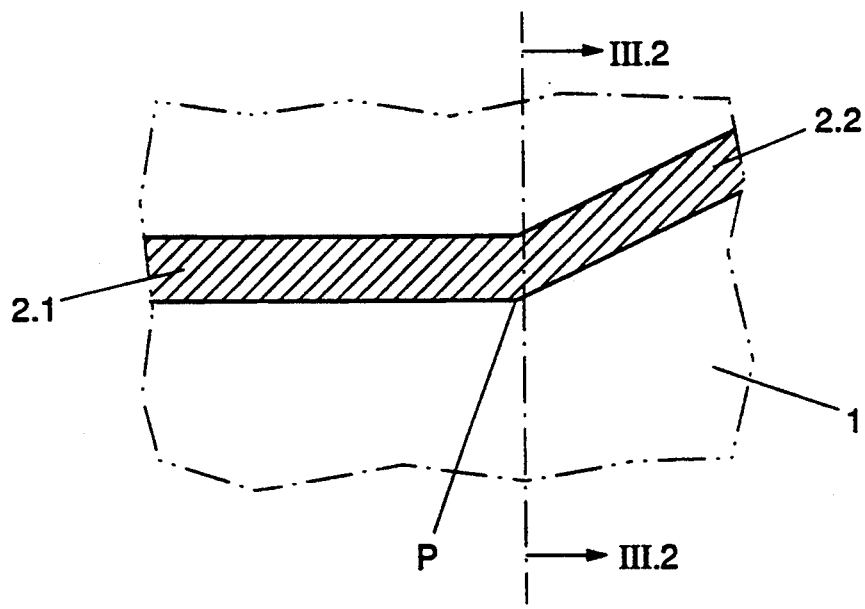
FIG. 2.2
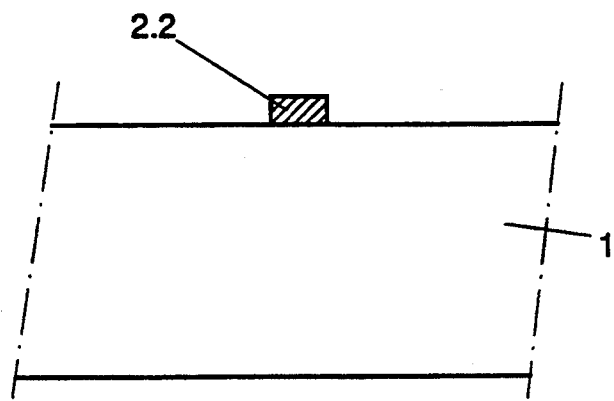
FIG. 3.2

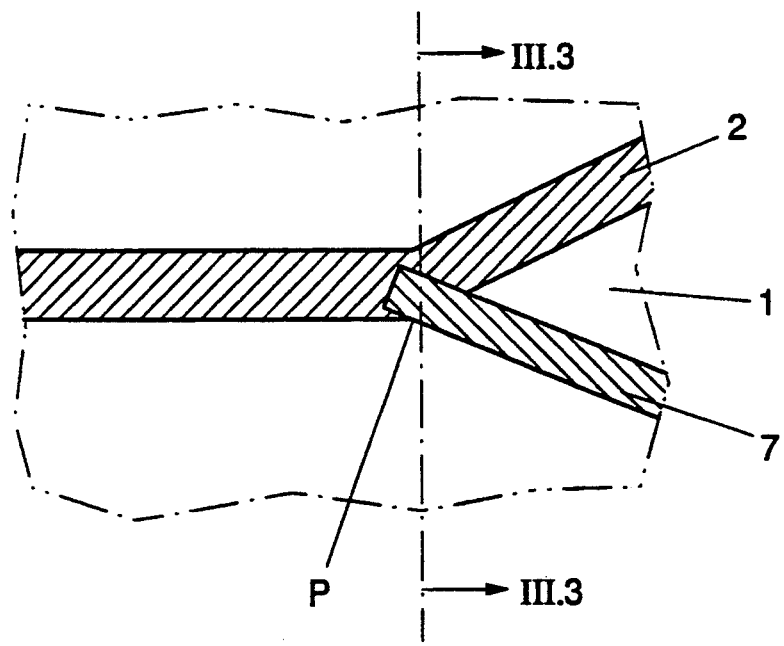
FIG. 2.3
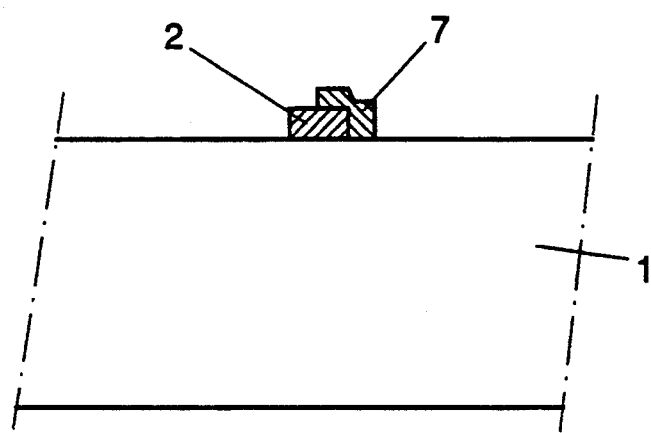
FIG. 3.3

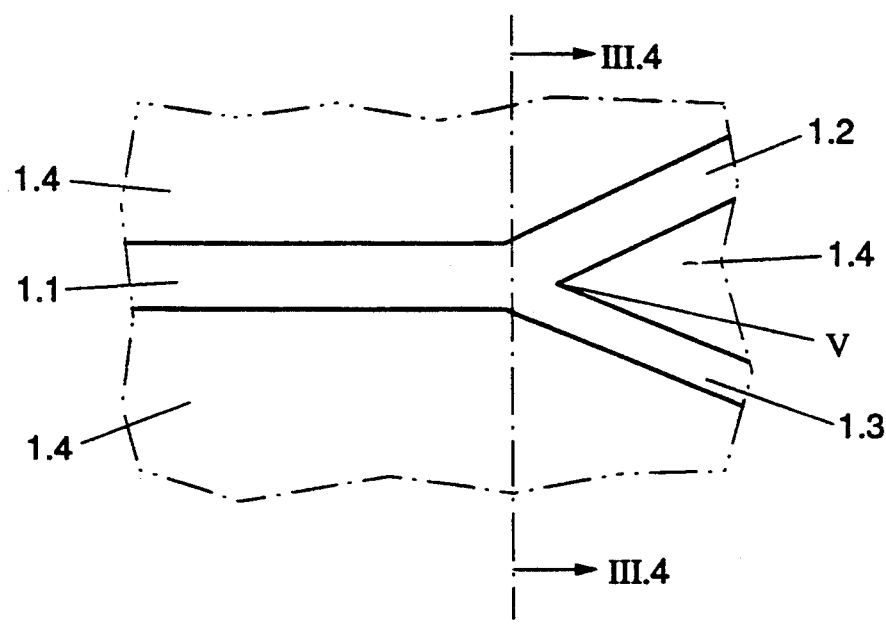
FIG. 2.4
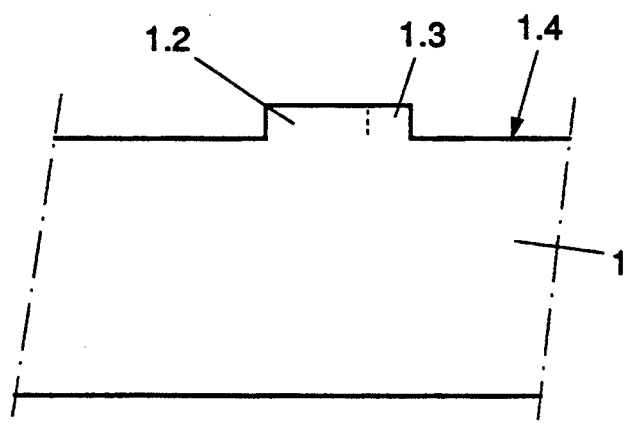
FIG. 3.4

METHOD OF MANUFACTURING SHARP WAVEGUIDE BRANCHES IN INTEGRATED OPTICAL COMPONENTS

A. BACKGROUND OF THE INVENTION

1. Field of the Invention

The invention is in the field of manufacturing integrated optical components. More particularly, it relates to a method of manufacturing channel-type waveguides having Y-shaped branches in thin light-guiding layers having sharp vertices using mask materials which overlap one another and are applied in different stages of photolithographic processes.

2. Prior Art

Y-shaped branches, also referred to as Y-junctions, of channel-type waveguides are very much used in integrated optics. In symmetrical form, for example, they form part of 3-dB couplers, while in asymmetric form they in fact form the basis of mode-splitting or mode-filtering elements. They also occur, of course, in guides which intersect one another at an acute angle. A problem which is known in this connection is that, if the vertex between two branching conductors in such a Y-junction is not manufactured sharply enough, unacceptable losses in the optical signal and impairment of the function of the Y-junction occur. The sharpness with which the vertex of the Y-junction can be manufactured is, however, dependent on the quality of the photolithographic processes used in the manufacture and in the masks used in these processes. Reference [1] discloses a method of forming Y-junctions having sharp vertices on the basis of indium phosphide (InP) in which the two waveguide branches of the Y-junction are successively defined by selectively etching twice with wet-chemical etchants using masks which overlap one another. For this purpose, in an assembly of layers which comprises a substrate and pairs of layers, each pair having an etch layer and an etch-stop layer, a first part of a mask pattern, defining a waveguide pattern, is etched in the uppermost pair of layers in a photoresist with the aid of a first mask in a first etching step. The photoresist of the first mask is then removed. A second photoresist mask is then applied at least partially over the first part of said mask pattern. As a result of arranging for the masks to define two straight paths at the position of overlapping, a branching waveguide pattern having a sharp vertex in the underlying pair of layers is produced after a second etching step with the same wet-chemical etchants. A disadvantage of this known manufacturing procedure is the use of selective wet-chemical etchants. Such etchants etch the material to be etched either isotropically or along crystal planes. In the first case underetching is known to occur, with loss of accuracy and undesired profiling of the waveguides as drawbacks. In the second case, only those waveguides which follow the orientation of the material can be etched well. In crystalline materials, therefore, wet-chemical etchants are unsuitable for etching curved waveguides. Curved waveguides specifically require a perpendicular anisotropic etching, which can in fact be achieved with dry etching procedures such as that known as reactive ion etching. Since curved waveguides are often needed in integrated optical components as connecting guides at the branches of Y-junctions, such components cannot be manufactured well with this known procedure. In addition, this known procedure requires a complicated layer pattern to form, in particular, the pattern in the uppermost pair of layers, which serves as mask in the second etching step but at the same time etched away except at the position of the overlapping. At that point, a residue is left behind which cannot be removed further without attacking the remaining structure.

B. SUMMARY OF THE INVENTION

The object of the invention is to provide a method of manufacturing channel-type waveguides having Y-shaped branches and sharp vertices in light-guiding layers on a substrate using masks which overlap one another and are used in different stages of photolithographic processes, which method does not have the drawbacks described above. At the same time, it uses only one auxiliary mask layer made of suitably chosen material which can be etched in a first etching step but is resistant in a second etching step involving dry etching. For this purpose, a method of manufacturing branching or mutually intercepting channel-type waveguides on a substrate comprising a light-guiding layer, to which substrate at least one auxiliary mask layer has been applied, which method comprises the following steps:

- the application of a first mask pattern of photosensitive material to the auxiliary mask layer, which first mask pattern comprises a subpattern for a first channel-type waveguide,
- a first etching step for etching the auxiliary mask layer not covered by the first mask pattern using first etchants,
- the removal of the photosensitive material of the first mask pattern, residues of the auxiliary mask pattern being left which correspond to the first mask pattern,
- the application of a second mask pattern of photosensitive material partially over the residues of the auxiliary mask layer, which second mask pattern comprises a subpattern for a second channel-type waveguide, which makes an acute angle with the first waveguide,
- a second etching step for etching parts not covered by the second mask pattern using second etchants,
- the removal of the photosensitive material of the second mask pattern, has according to the invention the characteristic that the second etching step is carried out using dry etchants, the substrate being provided with only one auxiliary mask layer of a material which is resistant in the second etching step.

The method according to the invention is especially suitable for forming asymmetrical branches having sharp vertices, but not only as a consequence of suitably chosen differences in the width of the waveguide branches. Thickness or height differences can also easily De achieved. For this purpose, the method preferably has the characteristic that, after the first etching step and before the step of applying the second mask pattern, an intermediate etching step is carried out using dry etchants in order to etch parts of the substrate which are not covered by the residues of the auxiliary mask layer.

The method is completely compatible with the manufacture of waveguide components on the basis of III-V semiconducting materials with the aid of a 'reactive ion etching' process if a silicon-containing dielectric material is used as auxiliary mask layer. In a preferred embodiment, the method according to the invention has the characteristic that the second etching step is carried out using the "reactive ion etching" process, the substrate provided with the light-guiding layer being manufactured from III-V semiconductor material and the auxiliary mask layer being manufactured from dielectric material.

Summary of the advantages of the invention:
the method promotes the capacity for integration with other components;
it can be easily applied;
it is very suitable for manufacturing especially asymmetrical branches, the desired asymmetry being easily achievable both as a result of width differences and as a result of height differences in the waveguide profiles;
it can be used for all III-V semiconductor materials;
the vertices or branch points are of high quality;
no additional epitaxial layers are necessary.

C. REFERENCES

[1] Y. Shani et al., "Buried rib passive waveguide Y junctions with sharp vertex on InP" IEEE Photonics Technol. Letters, vol. 3, No. 3, March 1991, pp. 210–212;

[2] H. Nishihara, et al., "Optical integrated circuits", McGraw-Hill Book Company, 1989, New York, cpt. 7 "Microfabrication techniques in optical integrated circuits", more particularly sections 7.2 and 7.3;

[3] H. Lehman and R. Widmer, "Profile control by reactive sputter etching", J. Vac Sci. Technol., vol. 15, no. 22, 1978, pp. 319–326;

[4] U. Niggebrugge and G. Garus, "A novel process for reactive ion etching on InP, using $CH_4/H_2$", Inst. Phys. conf., symp. GaAs and related compounds, vol. 79, pp. 367–372, 1985.

D. BRIEF DESCRIPTION OF THE DRAWING

The invention will be explained below by reference to a drawing comprising the following figures:

FIG. 1 shows, in cross section, an assembly of layers which is processed by the method according to the invention to form a Y-shaped waveguide pattern having a sharp vertex;

FIG. 2 comprises subfigures FIG. 2.1 to 2.4, inclusive, which consecutively show the assembly of layers according to FIG. 1 in a plan view in four different stages of processing;

FIG. 3 comprises subfigures FIG. 3.1 to 3.4 inclusive which consecutively show a section of the assembly of layers along the lines III.1—III.1 to III.4—III.4, inclusive, indicated in subfigures FIG. 2.1 to 2.4, inclusive;

E. DESCRIPTION OF AN EXEMPLARY EMBODIMENT

Figure 4:
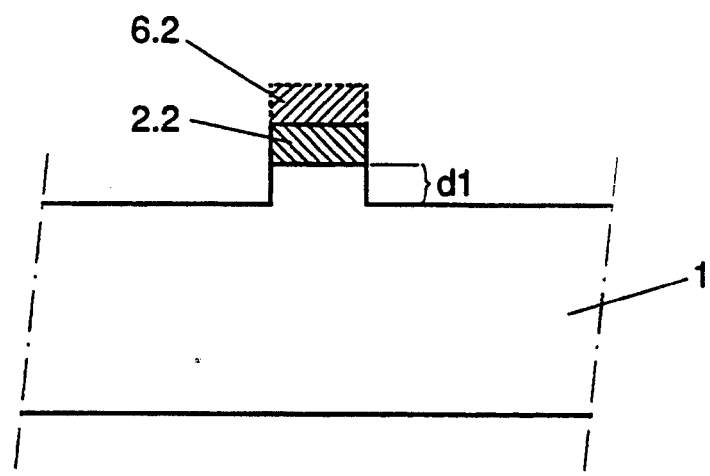
FIG. 4 shows a section of the assembly of layers, in a variant of the method according to the invention at a stage subsequent to the stage shown in FIG. 3.2.

Channel-type waveguides on substrates made of III-V semiconductor materials such as indium phosphide (InP) are usually manufactured by etching rib-type patterns in a suitable assembly of layers. In this connection, the known etching processes are, inter alia, wet-chemical etching and dry etching. Since such materials are crystalline and wet-chemical etching proceeds isotropically or via crystal planes, wet-chemical etching is unsuitable for forming branching channel-type waveguides on substrates of said semiconductor materials. Four procedures are disclosed in, for example, reference [2] for carrying out dry etching, namely plasma etching, sputter etching, ion-beam etching and etching with reactive ions (reactive ion etching (RIE)). All these dry etching procedures can in principle be used to form standard waveguide patterns such as 'ridge type', 'buried type' or 'strip-loaded type' on or in substrates of said semiconductor materials. The RIE process is, however, the most suitable. The manufacture of a 'ridge-type' waveguiding Y-junction on the basis of an InP substrate will be described below by way of example, the RIE process being used.

FIG. 1 shows, in section, an assembly of layers to be processed and comprising a substrate I which is based on InP and to which a thin $SiO_2$ auxiliary mask layer 2 has been applied. The substrate 1 comprises an InP base layer 3, an InGaAsP light-guiding layer 4, and an InP top layer 5. The top layer 5 is the layer which has to be provided with a pattern of ribs defining the desired waveguide pattern, in this case a waveguiding Y-junction, in the light-guiding layer 4.

FIG. 2, together with subfigures FIG. 2.1 to 2.4 inclusive, and FIG. 3, together with subfigures FIG. 3.1 to 3.4 inclusive, consecutively show different stages in the processing of the assembly of layers. Each subfigure FIG. 2.i (i=1,-,4) shows the assembly of layers in a plan view, while the corresponding subfigure FIG. 3.i shows the assembly of layers in the section along the line III.i-—III.i. A first mask pattern 6 is applied in photoresist to the thin auxiliary mask layer 2 by means of a photolithographic process. Said mask pattern 6 comprises a part of a Y-shaped pattern, in this example the trunk 6.1 and a side branch 6.2 thereof, which together form a pattern for a channel-type waveguide having a bend at point P. This stage is shown in FIG. 2.1 and FIG. 3.1. In a first etching step, the first mask pattern 6 is transferred to the auxiliary mask layer 2 by dry etching the latter. The photoresist of the first mask pattern is then removed. Of the auxiliary mask layer 2, only a trunk 2.1 and a side branch 2.2 of a Y-shaped pattern remain. This stage is shown in FIG. 2.2 and FIG. 3.2. As the next step, a second mask pattern of photoresist, which partially overlaps the first mask pattern, transferred to the auxiliary mask layer 2, is applied to the substrate 1 by means of a second photolithographic process. The second mask pattern comprises a straight strip 7 for a straight channel-type guide which intercepts the side branch 2.2 of the Y-shaped pattern in the auxiliary mask layer 2 in an overlapping manner at an acute angle near the bend P. This stage is shown in FIG. 2.3 and FIG. 3.3. The combined pattern of the residual auxiliary mask layer 2 and the second mask pattern of photoresist, in this case straight strip 7, is then used as mask in a second etching step employing a process of dry-etching the InP top layer of the substrate using an RIE process, for example using a $CH_4/H_2$ mixture. Then the photoresist of the second mask pattern is first removed; and, finally, the residues of the auxiliary mask layer 2. This final stage is shown in FIG. 2.4 and FIG. 3.4. Here the rib of the trunk of the Y-shaped waveguide pattern is indicated by 1.1, the rib of the first side branch by 1.2, the rib of the second side branch by 1.3, and the etched top surface of the substrate by 1.4. A sharp vertex V has been produced between the first side branch 1.2 and the second side branch 1.3.

The photolithographic process in which mask patterns are applied in photoresist and removed again is disclosed, inter alia, in reference [2] (more particularly, section 7.2 "Pattern Techniques"). The photoresist may be removed, for example, with acetone or $O_2$ plasma. A layer of silicon dioxide ($SiO_2$) is preferably dry-etched in an RIE process using fluorine-containing gases such as $CHF_3$, under which circumstances indium phosphide is, however, hardly attacked or not attacked; this is disclosed, for example, in reference [3]. The dry etching of indium phosphide in an RIE process using a $CH_4/H_2$ gas mixture is disclosed per se in reference [4]. The reference [4] also discloses that not only is a material such as photoresist, but also a material such as silicon dioxide is resistant under these circumstances. Both materials can therefore be used as mask materials in one and the same dry-etching process using a $CH_4/H_2$ gas mixture. The residues of silicon dioxide can be satisfactorily removed using, for example, an HF solution or a $CHF_3$ etching process.

The method described above must satisfy three requirements:
- the auxiliary mask layer must be capable of being formed in a layer which is thin enough not to interfere with the patterns of the second mask in photoresist;
- the materials of the auxiliary mask layer and the second mask must be sufficiently resistant to the etchants of the second etching process;
- the first mask transferred to the auxiliary mask layer and the second mask require alignment characteristics with respect to one another. In the case of asymmetrical Y-shaped branches, this relates especially to the angle between the two straight branching arms; the relative position of the branching arms with respect to one another is much less critical.

The material silicon dioxide is found to satisfy the first two requirements very well.

The silicon dioxide auxiliary mask layer can be applied to the substrate by various procedures, such as by vapour deposition, by sputtering, or by a PECVD (plasma-enhanced chemical vapour deposition) process.

Instead of silicon dioxide, other dielectric materials which are widely used in integration procedures for the manufacture of components on the basis of III-V semiconducting materials, such as silicon nitride ($Si_3N_4$) and silicon oxynitride, a mixed form of silicon nitride and silicon dioxide, can also be used.

EXAMPLE

The starting point is an InP substrate provided with a $70\pm5$ nm silicon dioxide layer. A positive reversal resist (AZ5206E manufactured by Hoechst) having a layer thickness of approximately 600 nm has been used both for the first and the second photoresist mask. The removal of the photoresist material of the first and the second mask was carried out in acetone and a final cleaning was carried out in a tubular-reactor plasma etcher (barrel etcher) using a 65 SCCM (standard cubic centimeters per minute) oxygen plasma at an RF power of 80-100 W. Both etching processes were carried out with a Nextral Reactive Ion Etcher model 110A.

Data of the first etching process: 20 SCCM $CHF_3$ plasma at 1.95 Pa reaction-chamber pressure and an RF power of 55 W (0.4 W/cm$^2$) and an $SiO_2$ etching rate of $10\pm2$ nm/min.

Data of the second etching process: a mixture of $H_2$ plasma (35 SCCM) and $CH_4$ plasma (7 SCCM) at 6.65 Pa reaction-chamber pressure and an RF power of 70 W (0.6 W/cm$^2$) and an InP etching rate of $29\pm2$ nm/min. The residues of the silicon dioxide layer were removed in a 10% HF solution in the course of approximately 1 min at ambient temperature, after which the etched substrate was additionally polished chemically by immersion in a 10% $H_3PO_4$ solution for 5 min.

With the thickness mentioned (70 nm) of the silicon dioxide auxiliary mask layer it was found possible to form waveguide branches having sharp vertices with a rounding diameter of $\leq 10$ nm in the manner described above.

Because the $SiO_2$ auxiliary mask layer can be made very thin compared with the photoresist layer, the first etching step can nevertheless be carried out wet-chemically without being appreciably troubled by the drawbacks mentioned above. For this purpose, a process such as that indicated above for the removal of the residues of the silicon oxide layer can be used.

Figure 5:
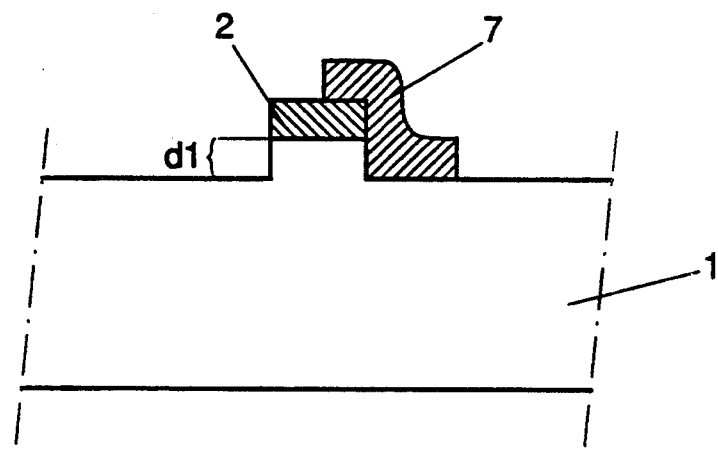
FIG. 5 shows a section of the assembly of layers in the method variant of FIG. 4 at a stage corresponding to FIG. 3.3.
Figure 6:
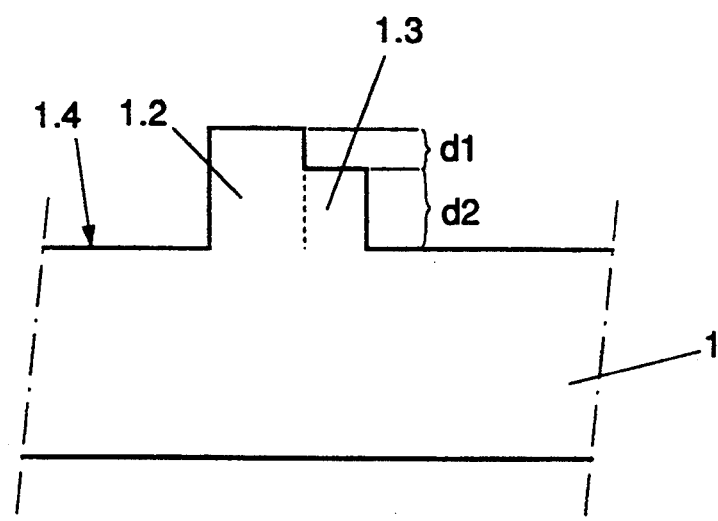
FIG. 6 shows a section of the assembly of layers in the method variant of FIG. 4 at a stage corresponding to FIG. 3.4.

In the process described with reference to FIG. 2.1 to 2.4, inclusive, and FIG. 3.1 to 3.4, inclusive, the Y-shaped waveguide pattern is formed in two different etching steps. This makes the method according to the invention very suitable for the manufacture of, in particular, asymmetrical branches. The process described results in side branches 1.2 and 1.3 having rib-type patterns of equal rib height. A desired asymmetry in the side branches 1.2 and 1.3 can easily be achieved by a difference in the rib width. In some cases, however, the extent of the asymmetry to be obtained in this manner Is insufficient. A desired asymmetry is also produced, or is further intensified, by a difference in rib height between the branches. Such a difference in rib height is achieved by already etching parts of the substrate which are not covered by residues 2.1 and 2.2 of the auxiliary mask layer 2 (possibly having residues 6.1 and 6.2 of the first mask pattern still present on them) to a first etching depth $d_1$ in an intermediate etching step prior to the step of applying the second photoresist mask pattern 7. In a corresponding manner to FIG. 3.2 and with the same plan view as shown in FIG. 2.2, FIG. 4 shows a picture of the section of the assembly of layers at this stage, that is to say immediately after carrying out the intermediate etching step. The second mask pattern 7 is then applied in the position which partially overlaps the residues of the auxiliary mask layer 2. FIG. 5 shows a sectional picture of this stage corresponding to a subfigure FIG. 3.3. The etching of the InP top layer of substrate 1 is then continued in the second etching step to an etching depth $d_2$. After the photoresist of the second mask pattern 7 and the residues of the auxiliary mask 2 have been removed, a Y-shaped waveguide pattern is left in which the ribs of the trunk 1.1 and the first side branch 1.2 have a height $d_1+d_2$ and the rib of the side branch 1.3 has a height $d_2$. FIG. 6 shows a sectional picture of this last stage corresponding to subfigure FIG. 3.4.

The etching of the InP top layer of the substrate to a depth of $d_1$ in the intermediate etching step can be carried out as a continuation of the etching process in the first etching step, with which the first mask pattern 6 is transferred to the auxiliary mask layer 2. In this case, the first etching step has to be carried out using etchants which are also able to etch the InP top layer. For this purpose, for example, the fluorine-containing gases such as CHF$_3$ of the first step can be used, although the etching rate for InP is very low and therefore such a continuation of the first etching process will take a long time. A second possibility is that the intermediate etching step is achieved by carrying out the second etching step in two substeps, the dry etching of the InP top layer by the RIE process mentioned already being started before the application of the second photoresist mask pattern 7 and being continued after the application thereof. A third possibility is to carry out the first etching step and the second etching step using the same dry etchants and already to etch the top layer of the substrate to a depth d$_1$ during the first etching step. The second and the third possibility for achieving the intermediate etching step require, of course, an accurate timing of the etching duration in order to reach the desired etching depths d$_1$ and d$_2$ with sufficient accuracy.

We claim:

1. Method of manufacturing branching or mutually intercepting channel-type waveguides on a substrate comprising a light-guiding layer, to which substrate at least one auxiliary mask layer has been applied, which method comprises the following steps:

the application of a first mask pattern of photosensitive material to the auxiliary mask layer, which first mask pattern comprises a subpattern for a first channel-type waveguide, a first etching step for etching the auxiliary mask layer not covered by the first mask pattern using first etchants, the removal of the photosensitive material of the first mask pattern, residues of the auxiliary mask pattern being left which correspond to the first mask pattern, the application of a second mask pattern of photosensitive material partially over the residues of the auxiliary mask layer, which second mask pattern comprises a subpattern for a second channel-type waveguide, which makes an acute angle with the first waveguide, a second etching step for etching parts not covered by the second mask pattern using second etchants, the removal of the photosensitive material of the second mask pattern, characterized in that the second etching step is carried out using dry etchants, the substrate being provided with only one auxiliary mask layer of a material which is resistant in the second etching step.

2. Method according to claim 1, characterized in that, after the first etching step and before the step of applying the second mask pattern, an intermediate etching step is carried out using dry etchants in order to etch parts of the substrate which are not covered by the residues of the auxiliary mask layer.

3. Method according to claim 2, characterized in that, in the first etching step, etchants are used with which the substrate can be etched, and the intermediate etching step is carried out using the same etchants as are used in the first etching step, the first etching step being continued even after the parts of the auxiliary mask layer which are not covered by the first mask pattern have been etched away.

4. Method according to claim 2, characterized in that the intermediate etching step is carried out using the same etchants as are used in the second etching step.

5. Method according to claim 1, characterized in that the second etching step is carried out using the "reactive ion etching" process, the substrate provided with the light-guiding layer being manufactured from III-V semiconductor material and the auxiliary mask layer being manufactured from dielectric material.

6. Method according to claim 5, characterized in that the first etching step is carried out using a "reactive ion etching" process.

7. Method according to claim 2, characterized in that the second etching step is carried out using the "reactive ion etching" process, the substrate provided with the light-guiding layer being manufactured from III-V semiconductor material and the auxiliary mask layer being manufactured from dielectric material.

8. Method according to claim 7, characterized in that the first etching step is carried out using a "reactive ion etching" process.

9. Method according to claim 1, characterized in that the first etching step is carried out wet-chemically.

10. Method according to claim 1, characterized in that the residues of the auxiliary mask layer are removed in a third etching step using the same etchants as are used in the first etching step.

11. Method according to claim 3, characterized in that the intermediate etching step is carried out using the same etchants as are used in the second etching step.

12. Method according to claim 2, characterized in that the first etching step is carried out wet-chemically.

13. Method according to claim 2, characterized in that the residues of the auxiliary mask layer are removed in a third etching step using the same etchants as are used in the first etching step.

* * * * *